United States Patent
Barlow et al.

(10) Patent No.: US 8,108,724 B2
(45) Date of Patent: Jan. 31, 2012

(54) FIELD REPLACEABLE UNIT FAILURE DETERMINATION

(75) Inventors: Jeffrey A. Barlow, Wilton Manors, FL (US); Howard Calkin, Davis, CA (US); Andrew C. Walton, Rocklin, CA (US); Anurupa Rajkumari, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 70 days.

(21) Appl. No.: 12/641,072

(22) Filed: Dec. 17, 2009

(65) Prior Publication Data

US 2011/0154097 A1 Jun. 23, 2011

(51) Int. Cl.
*G06F 11/00* (2006.01)
(52) U.S. Cl. .......................................... 714/25
(58) Field of Classification Search .................. 714/4.1, 714/4.12, 4.2, 4.3, 4.4, 6.12, 6.32, 18–20, 714/36, 31, 37, 45, 46, 48, 57
See application file for complete search history.

(56) References Cited

U.S. PATENT DOCUMENTS

| | | | |
|---|---|---|---|
| 5,220,567 A * | 6/1993 | Dooley et al. ................. 714/704 |
| 5,539,877 A | 7/1996 | Winokur et al. |
| 6,625,745 B1 * | 9/2003 | Johnson et al. ................ 714/4.4 |
| 6,665,822 B1 * | 12/2003 | Conway ........................ 714/47.1 |
| 7,082,554 B2 | 7/2006 | Wilson et al. |
| 7,188,346 B2 | 3/2007 | Martin et al. |
| 7,231,550 B1 * | 6/2007 | McGuire et al. ................ 714/26 |
| 7,313,717 B2 * | 12/2007 | Vecoven et al. ................ 714/4.2 |
| 7,343,529 B1 | 3/2008 | Klinkner et al. |
| 7,669,077 B2 * | 2/2010 | Yamamoto et al. .......... 714/5.11 |
| 7,872,982 B2 * | 1/2011 | Atkins et al. .................. 370/252 |
| 2003/0097608 A1 * | 5/2003 | Rodeheffer et al. ............. 714/7 |
| 2005/0278575 A1 * | 12/2005 | Nicholson et al. .............. 714/37 |
| 2006/0002705 A1 | 1/2006 | Cline et al. |

\* cited by examiner

*Primary Examiner* — Nadeem Iqbal

(57) ABSTRACT

A system and method for fault management in a computer-based system are disclosed herein. A system includes a plurality of field replaceable units ("FRUs") and fault management logic. The fault management logic is configured to collect error information from a plurality of components of the system. The logic stores, for each component identified as a possible cause of a detected fault, a record assigning one of two different component failure probability indications. The logic identifies a single of the plurality of FRUs that has failed based on the stored probability indications.

20 Claims, 3 Drawing Sheets

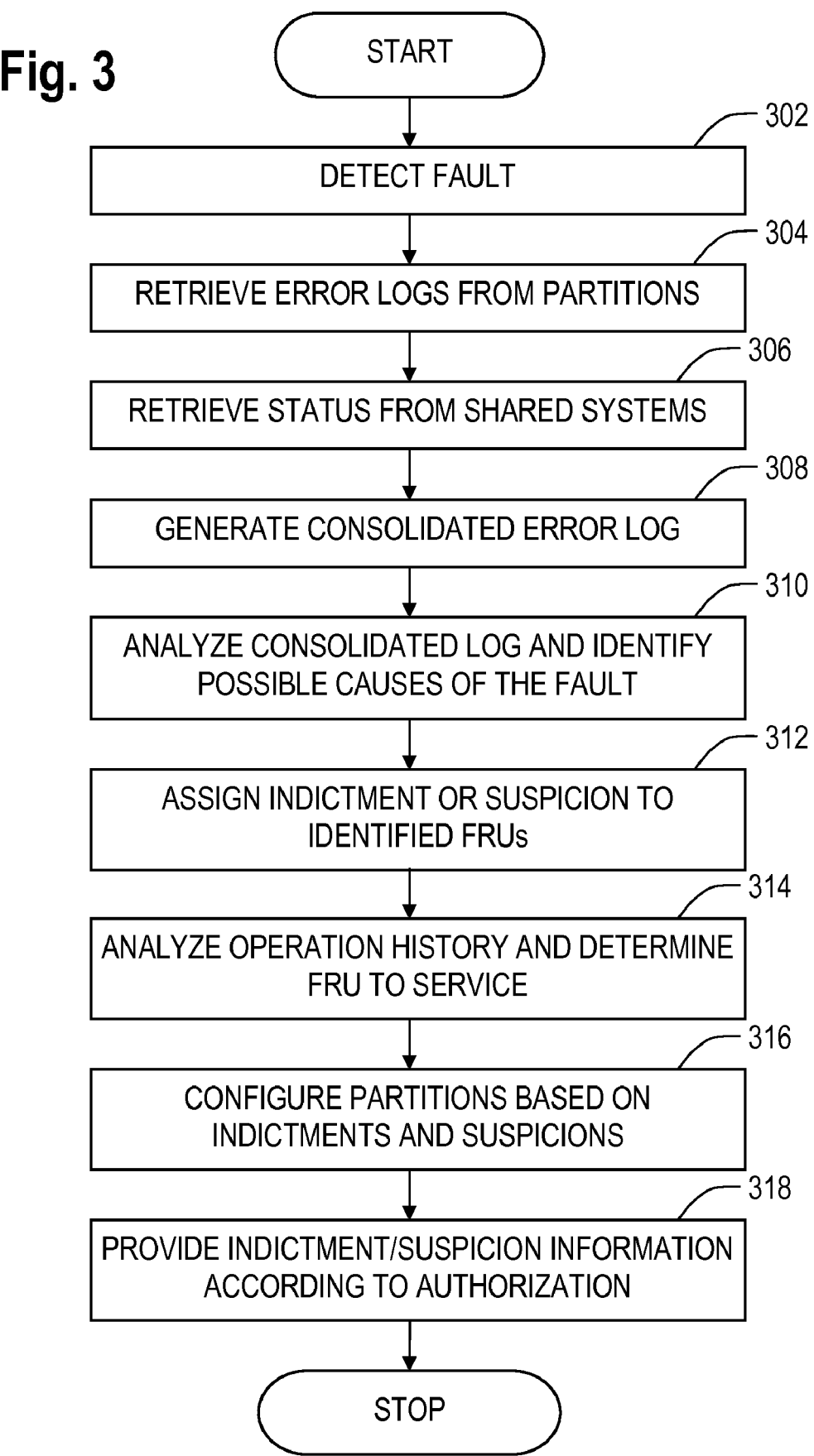

FIELD REPLACEABLE UNIT FAILURE DETERMINATION

BACKGROUND

A server computer can include any number of processors. Processors and supporting hardware in a server can be organized (i.e., partitioned) to provide an execution platform for one or more operating systems. Each operating system includes error logging capabilities to, for example, track and record a detected fault, effects of a fault, and actions take responsive to a fault. A server hardware fault can induce error logging and/or reporting activities in any number of processors and/or operating systems of the server. Diagnostic systems may examine the resulting error logs to determine a cause for the detected fault.

BRIEF DESCRIPTION OF THE DRAWINGS

For a detailed description of exemplary embodiments of the invention, reference will now be made to the accompanying drawings in which:

FIG. 3 shows a flow diagram for a method for managing faults in a computer system in accordance with various embodiments.

NOTATION AND NOMENCLATURE

Figure 1:
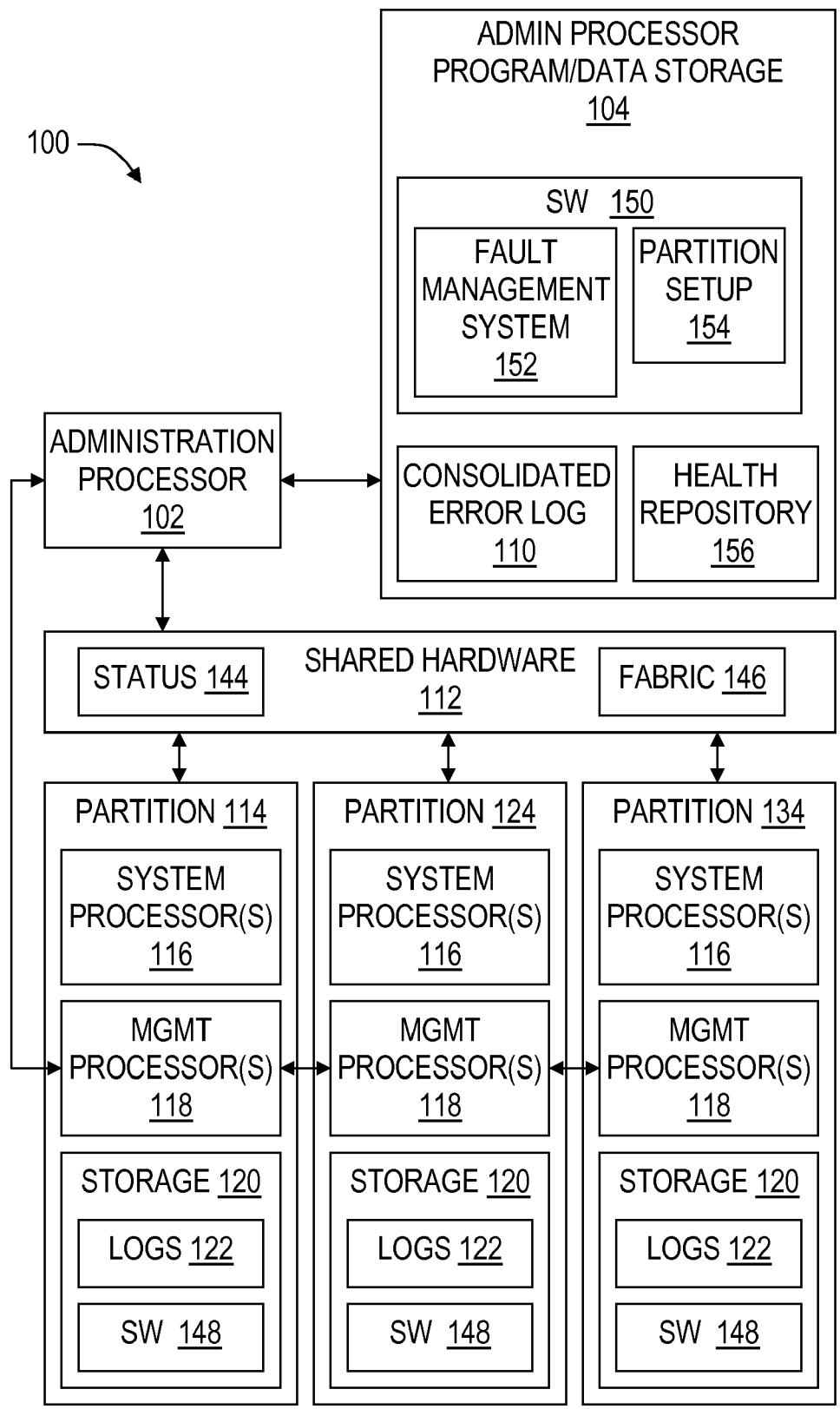
FIG. 1 shows a block diagram of a computer system including fault management in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

A field replaceable unit ("FRU") is a device or assembly that can be replaced at an operating location of a system in which the FRU is installed (i.e., in the field). A FRU can be replaced quickly and easily without transporting an upper level assembly including the FRU to a repair location to perform the replacement.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A server computer can be configured to support multiple hard partitions. A hard partition is a set of hardware dedicated to a particular execution environment, such as a particular operating system ("OS"). For security reasons, hard partitions are generally isolated and data sharing between partitions is prohibited. Each hard partition includes at least one processor that accumulates error information relevant to the partition. Similarly, a server can be configured to allow a single set of hardware components to support multiple virtual partitions. Like hard partitions, virtual partitions are isolated. Virtual partitions use software means to provide isolation due to the shared hardware resources.

When a fault occurs in a server, for example a hardware failure, the fault may affect and be reported by multiple processors within a partition. Based on the plurality of error reports, server diagnostic systems may identify multiple components or field replaceable units ("FRUs") as requiring service. Such recommendation often results in replacement of fully operational hardware and the incurrence of unnecessary expense. Moreover, unwarranted introduction of new hardware into the server can needlessly spawn new problems in the server.

Embodiments of the present disclosure include logic that recommends replacement of an FRU only if there is a very high probability that the FRU is the root cause of a detected fault. The logic analyzes and correlate seemingly unrelated events reported from multiple levels of a system to determine and report the root cause of a fault. The logic bases fault root cause analysis on operational history of each FRU/sub-FRU possibly causing the fault as well as server conditions proximate to fault detection.

FIG. 1 shows a block diagram of a computer 100 (e.g., a server computer) including fault management in accordance with various embodiments. The computer 100 includes one or more system processors 116, one or more management processors 118, and one or more data/program storage modules 120. In some embodiments, the system processors 116 and associated components may be embodied in blade computers. Blade computers are modularized computers configured for installation in a blade enclosure. A blade enclosure may support multiple blade computers, and the computer 100 may include one or more enclosures. A blade or other computer board may be a FRU. Similarly, one or more system processors 116 may be a FRU, for example, a processor chip may include multiple processor cores, each core being a component (e.g., a processor 116) of the processor FRU.

The management processors 118 are independent from the system processors 116. The management processors 118 provide control and administration of various computer 100 resources outside the control of the system processors 116. For example, hardware resources shared by multiple system processors 116 may be controlled by a management processor 118 rather than by the system processors 116. In some embodiments, each blade includes a management processor 118.

The storage 120 may be volatile or non-volatile semiconductor memory, magnetic storage, optical storage, etc. The storage 120 is a computer-readable medium at least a portion of which can be accessed by the system processors 116. Some portions of storage 120 may be accessed by the management processors 118. Some embodiments of the storage 120 include forward error correction that corrects some faulty data provided from the storage 120. Software programming 148 (e.g., an OS, application programs, firmware, etc.) executable by the processors 116, 118 may be included in the storage 120. The storage 120 may be FRU. For example, the storage 120 may be a dual in line memory module.

The system processors 116 are allocated to isolated partitions 114, 124, 134. In embodiments wherein the partition 114 comprises a hard partition, hardware means are employed to isolate the partition 114 (i.e., preclude inter-partition communication) from other partitions 124, 134. For example, one or more blade computers may be assigned to a partition 114, and no communication paths are configured between the partitions 114, 124, 134. Alternatively, if the partition 114 comprises a virtual partition, then the partition 114 may share a processor 116 with another virtual partition, and isolation of the virtual partitions is implemented by software. Each partition 114, 124, 134 may execute a different OS and/or application programs.

The partitions 114, 124, 134 are coupled to shared hardware 112. The shared hardware includes various resources, such as communication links (i.e., fabric links 146) connecting processors 116, processors and memory, and/or processors and other resources, such as networking or input/output devices.

An administration processor 102, also known as an onboard administrator, provides high-level services to the computer 100. The administration processor 102 provides a point of control for performance of various management tasks, such as configuration of the computer 100 components, partition configuration, control of computer power and cooling systems, and computer level communication. In some embodiments, the administration processor 102 is coupled to the management processors 118 by a dedicated communication link (i.e., a communication link not used by the system processors 116), thereby allowing communication between the administration processor 102 and the management processors 118 when system level communications are disrupted.

The administration processor 102, the management processor 118 and the system processors 116 may be, for example, general-purpose processors, digital signal processors, microcontrollers, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

An administration processor program/data storage module 104 is a computer-readable medium coupled to the administration processor 102. The storage module 104 may be volatile or non-volatile semiconductor memory, magnetic storage, optical storage, etc. Some embodiments of the storage module 104 include forward error correction that corrects some faulty data provided from the storage module 104. Software programming 150 executable by the administration processor 102 may be included in the storage module 104 (e.g., the fault management system 106 and partition setup 154).

During computer 100 operation, various events are logged for use in debugging. When a hardware fault is detected (e.g., via fault detection circuitry or identification of adverse side effects) in the partition 114, each processor 116 of the partition 114 may independently generate an error log 122 reporting the fault. The management processors 118 may also generate error logs 122 related to components controlled thereby (e.g., shared hardware 112). The fault management system 152, executed by the administration processor 102, retrieves the various error logs 122 and combines the information contained in the error logs 122 with other event information and computer 100 status to produce a consolidated error log 110. The consolidated error log 110 includes information deemed relevant to determining a root cause of the detected fault.

The consolidated error log 110 can include information not related to the fault by the error logs 122. For example, the fault management system 152 recognizes that computer 100 environmental conditions can precipitate faults in computer 100 hardware. Elevated temperature can cause processor 116 and/or storage 120 errors that may be reported via error logs 122 as faults in multiple processor 116 and/or storage 120 instances. The fault management system 152 understands what components make up a partition, and that multiple error logs 122 can be generated when certain faults are detected and consequently retrieves all expected logs 122 based the type of fault detected. For example, the fault management system 152 understands that an OS crash due a hardware error can produce an error log 122 from each processor 116 of the partition 114. Thus, for a detected fault, the fault management system retrieves all expected error logs 122 and produces a single consolidated error log applicable to determining a cause of the fault.

The fault management system 152 analyzes the consolidated error log 110 to determine which components/FRUs of the computer 100 are possible root causes of the detected fault. In some embodiments, the fault management system 152 identifies for replacement a FRU most likely to be the root cause of the detected fault. The analysis correlates events at multiple levels of computer 100 operation to determine a root cause. For example, computer 100 environmental information is correlated with error logs 122 because the fault management system 152 understands that environmental factors (e.g., temperature, power conditions, etc.) can produce hardware errors. Accordingly, components/FRUs generating errors may not be reported as faulty when errors result from an environmental event, but rather a higher-level system such as a temperature control system may be reported as requiring service.

When the fault management system 152 identifies an error related to a particular component or FRU, it does not dismiss the possibility that the component is faulty even though another component is likely to be the root cause the error. Instead, the fault management system 152 assigns levels of fault probability to components possible causing the fault to indicate the likelihood that that each component is faulty.

The fault management system 152 represents two levels of fault likelihood by utilizing concepts of "indictment" and "suspicion." An indictment is registered against any component for which there is a high confidence of failure (e.g., the component more likely than not is faulty). A suspicion is registered against components for which there is most likely not a failure, but a possibility of failure cannot be dismissed (e.g., the component less likely than not is faulty). The fault management system 152 may include information derived from previously analyzed faults to aid in determining the probability of particular component failures producing a set of symptoms.

The fault management system 152 stores indictment and suspicion records in the health repository 156. The health repository 156 may be distributed across the various hardware system of the computer 100 in some embodiments. For example, portions of the health repository relevant to a particular blade computer may reside in storage 120 of the blade. In other embodiments, the health repository 156 is centralized as shown.

The fault management system 152 considers component history (e.g., past indictments and suspicions written into the health repository 156 by the fault management system 152) as part of root cause determination. The indictment and suspicion records are read from the health repository 156 during fault analysis. Thus, while a suspicion indicates a low probability of fault, the more suspicion records that are associated with a component, the greater the likelihood that the component will be considered defective by the fault management system 152.

The partition setup module 154 is executed by the administration processor 102 to configure the partitions 114, 124, 134. The partition setup module 154 can access the health repository 156 to ascertain the health of various hardware components when partitions are being configured, for example, at computer 100 initialization or for post fault reconfiguration to remove a defective component from service.

The health repository 156 provides an interface for retrieving/viewing computer 100 hardware health. A first class of user (e.g., service personnel) may access all stored health information (e.g., both indictments and suspicions) on validation of authority (e.g., passcode entry). Other users (i.e., non-authenticated users) may be provided with information only regarding FRUs highly likely to be a root cause of a fault (e.g., indicted FRUs). In this way, embodiments limit information regarding low probability causes of a fault to those best prepared to make proper use of the information.

Figure 2:
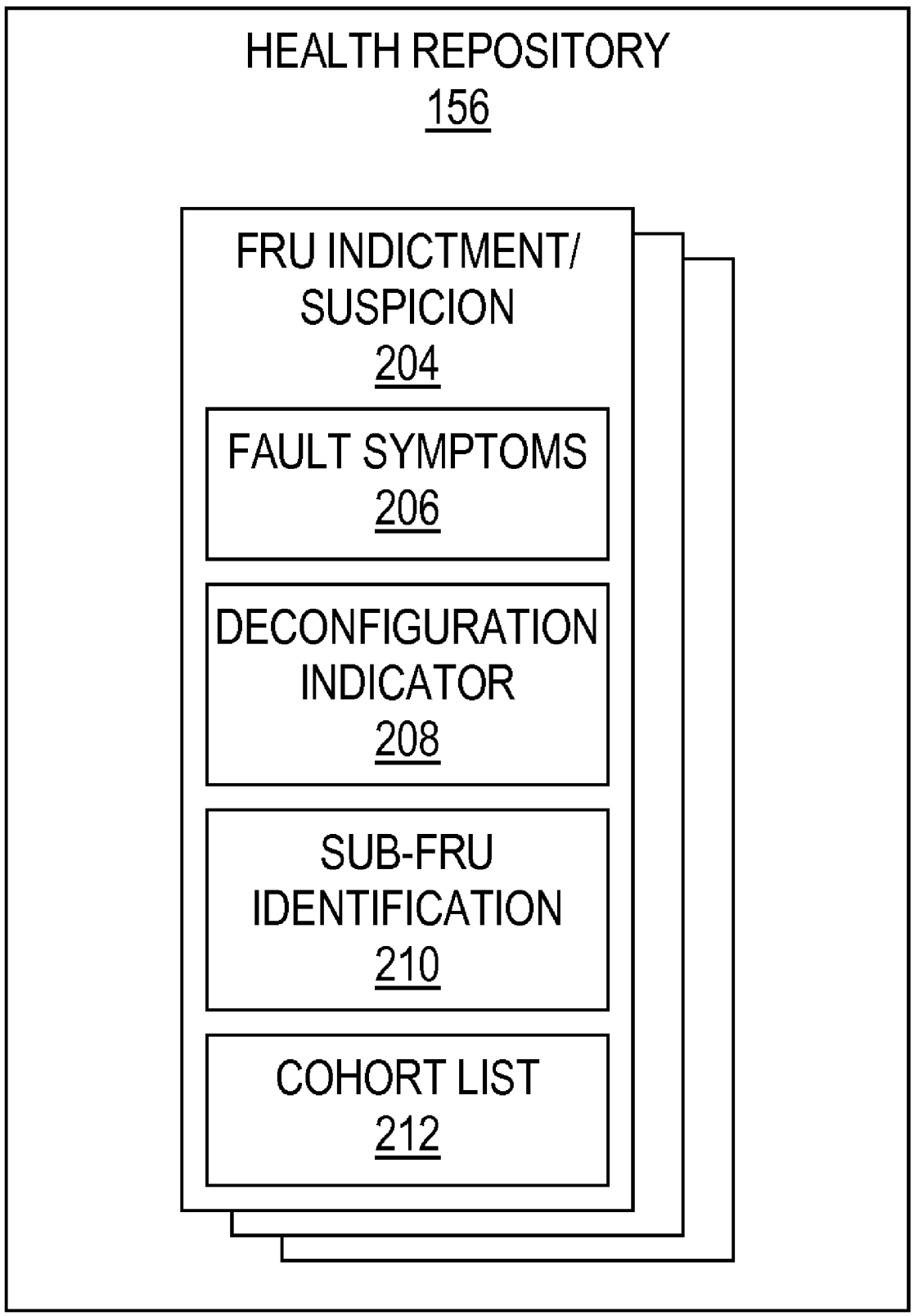
FIG. 2 shows a block diagram of a health repository including a field replaceable unit ("FRU") indictment/suspicion record in accordance with various embodiments.

FIG. 2 shows a block diagram of a health repository 152 including FRU indictment/suspicion records 204 in accordance with various embodiments. The FRU indictment/suspicion records 204 provide a history of FRU operation. The fault management system 152 and the partition setup module 154 access the FRU history to diagnose computer faults and to direct partition configuration (e.g., post-fault deconfiguration of partition components).

The indictment/suspicion record 204 includes a number of fields. The fault symptoms field 206 defines a symptom of a detected fault identified by analysis of the error logs 122 retrieved from the partitions 114, 124, 134. The fault management system 152 recognizes patterns in the error information that represent the symptoms. The symptom information provides a basis for understanding why the indictment or suspicion has been recorded for the FRU.

The deconfiguration indicator 208 signifies whether the FRU or a component of the FRU (a sub-FRU) should be removed from service. For example, if an instance of the processor 116 is determined to be faulty, the partition setup module 154 may reconfigure the partition 114 to operate without the defective processor 116. Some components/FRUs may be deconfigured when a fault is detected. Other components/FRUs may be deconfigured at computer 100 initialization (e.g., computer 100 boot) based on the value of the deconfiguration indicator 208.

The sub-FRU identification field 210 identifies a particular component (i.e., sub-FRU) of the FRU that is likely to have caused the fault. For example, if a processor FRU includes multiple processors 116, the particular processor 116 believed to be faulty is specified.

The cohort list 212 identifies all FRUs that may be a root cause of a particular fault associated with the record 204. The cohort list 212 allows for display of fault related FRUs and dismissal of indictments and suspicions when the computer 100 is serviced and/or the fault is repaired. Embodiments maintain FRU indictment/suspicion records 204 after dismissal to provide FRU operational history for use by the fault management system 152 in future diagnostic analyses.

FIG. 3 shows a flow diagram for a method for managing faults in a computer in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 3, as well as other operations described herein, can be implemented as instructions stored in a computer-readable medium and executed by a processor.

In block 302, the computer 100 is operational and the system processors 116, management processors 118, administration processor 102, and other computer 100 systems are performing various processing operations. A hardware fault is detected. A detected hardware fault may include, for example, a memory error or error related to a processor, circuitry, or device of the computer 100 (e.g., a FRU). A device responsible for logging the detected fault is notified. Notification may be by interrupt, polling, response timeout, etc. The device notified can vary based on the fault detected. For example, a system processor 116 can be notified regarding one type of fault, while a management processor 118 is notified regarding a different type of fault. A detected fault may be correctable or uncorrectable.

Responsive to fault notification, a device (e.g., processor 116) generates an error log 122 containing information related to the fault. Some faults, for example faults in shared hardware, may result in notification of multiple logging entities, and correspondingly result in generation of multiple error logs 122.

In block 304, the administration processor 102, via execution of the fault management system 152, retrieves error logs 122 generated by the system processors 116 isolated within the partitions 114, 124, 134 of the computer 100. In some embodiments, the error logs 122 generated by the system processors 116 are retrieved via the management processors 118.

In block 306, the administration processor 102 retrieves error logs generated by the management processors 118. Such error logs may include information related to shared hardware 112, including the communication fabric 146 connecting various computer 100 components, and chip set status registers 144. The administration processor 102 also retrieves information regarding components controlled by the processor 102, for example power and cooling systems, and retrieves computer 100 environmental information.

In block 308, the administration processor 102 generates a consolidated error log 110. The consolidated error log 110 includes all of the information available in the computer 100 that is relevant to the detected fault. If the fault was determined to be correctable, then the administration processor 102 may delay generation of the consolidated error log 110 until recovery operations are complete. Thereafter the consolidated error log 110 may include results of the recovery operation.

In block 310, the fault management system 152 causes the administration processor 102 to analyze the consolidated error log 110. Based on the error log analysis, fault symptoms and potentially defective FRUs/sub-FRUs that may have caused the fault are identified. Error and operational information provided from multiple levels (e.g., blade firmware, partition OS, management processors, administration processor, etc.) of the computer 100 is correlated to identify hardware that may have caused the fault. Such correlation helps identify causation that may not be directly related to an error report.

In block 312, the various FRUs/sub-FRUs identified as possibly causing the fault are categorized in accordance with the likelihood that the FRU actually caused the fault. Indictment records are recorded in the health repository 156 for the FRUs considered highly likely to have caused the fault. Suspicion records are recorded in the health repository 156 for those FRUs that possibly may have but are not likely to have caused the fault.

In block 314, the fault management system 152 further analyzes the consolidated error log 110 in conjunction with the operational history (e.g., the indictment/suspicion records 204 stored in the health repository 156) of the identified FRUs. The analysis weighs indictment/suspicion records 204 as indicators of an FRU being a root cause of the fault. Based on the analysis, the fault management system 152 identifies an FRU most likely to be the root cause of the fault, and may notify a support entity and/or a computer user of the fault and the determined root cause.

In block 316, the partition setup module 154 configures/reconfigures the partitions 114, 124, 134 for operation based on the indictment/suspicion records 204 stored in the health repository. Possibly defective FRUs and/or sub-FRUs may be removed from service (i.e., deconfigured).

In block 318, the health repository 156 provides indictment/suspicion information, e.g., to a user, in accordance with the user's authorization to view a particular level of information. For example, service personnel or systems may be authorized to view or access both indictment and suspicion records, while other users are allowed to view only indictment records. Authorization may be by challenge or other known means of access restriction.

The above discussion is meant to be illustrative of the principles and various embodiments of the present invention. Numerous variations and modifications will become apparent to those skilled in the art once the above disclosure is fully appreciated. For example, while the fault management system 152 has been described herein as implemented in the computer 100, those skilled in the art will understand that embodiments are applicable to fault management in any of a variety of computer based systems. It is intended that the following claims be interpreted to embrace all such variations and modifications.

What is claimed is:

1. A system, comprising:
a plurality of field replaceable units ("FRUs");
and fault management logic configured to collect error information from a plurality of components of the system, and to store, for each component identified as a possible cause of a detected fault, a record assigning one of two different component failure probability indications, and to identify a single one of the plurality of FRUs that has failed based on the stored probability indications.

2. The system of claim 1, wherein the fault management logic is configured to collect and analyze non-error system information and to determine based on the non-error system information whether a system event not reported as an error caused a reported component error.

3. The system of claim 2, wherein the non-error system information comprises information indicating an environmental condition of the system.

4. The system of claim 1, wherein the identified FRU comprises a plurality of components and the fault management logic is configured to relate the components to the FRU.

5. The system of claim 1, wherein the fault management logic is configured to send a single failure message regarding the identified FRU even though the identified FRU reports multiple different failures over time.

6. The system of claim 1, wherein the fault management logic is configured to anticipate generation of multiple different error logs by different components of the system based on occurrence of an error event, to consolidate the multiple error logs into a single error log, and to analyze the single error log.

7. The system of claim 1, wherein the two different component failure probability indications comprise:
a first probability indication signifying that a component is more likely than not the cause of failure; and
a second probability indication signifying that a component is possibly, but less likely than not the cause of the failure.

8. The system of claim 7, wherein the fault management logic is configured to provide, based on entry of a predetermined authorization value, error information related to FRUs assigned either of the first and second probability values in connection with a specified error, and to display, based on non-entry of the authorization value, only error information related to FRUs assigned the first probability value.

9. The system of claim 7, wherein the fault management logic is configured to identify the FRU that has failed based on a number of records stored for the FRU including the second probability value.

10. The system of claim 7, wherein the two different component failure probability indications each comprise:
Information indicating a symptom of a fault related to a given FRU;
an indication of whether the given FRU should be deconfigured;
information indicating a component of the given FRU to which the fault is isolated; and
a list of other FRUs possibly causing the fault.

11. The system of claim 1, further comprising a database configured to retain the records after a fault related to the records is resolved; wherein the fault management logic is configured to determine the FRU that has failed by analyzing retained records related to resolved faults.

12. The system of claim 1, wherein the fault management logic is configured to determine the FRU that has failed based on error information generated at multiple operational levels of the system.

13. A method, comprising:
receiving, by a processor, error information related to a fault, from a plurality of components of a computer system;
assigning, by the processor, one of two predetermined probability indication values to each of the plurality of components determined to be a possible cause of the fault;
determining, by the processor, based on the assigned predetermined probability indication values, a given one of a plurality of field replaceable units (FRUs) that should be replaced to correct the fault.

14. The method of claim 13, further comprising:
retrieving non-error related computer system event information responsive to the fault; and
analyzing effects of the event on computer system FRUs as part of the determining.

15. The method of claim 13, further comprising:
retrieving a plurality of error logs from different components of the computer system responsive to the fault;
consolidating the error logs; and analyzing the consolidated error log as part of the determining.

16. The method of claim 13, further comprising:

displaying, based on entry of an authorization code, error information related to any FRU being a possible cause of the fault; and displaying, based on non-entry of the authorization code, error information related to any FRU being more likely than not a cause of the fault.

17. The method of claim 13, further comprising determining the given FRU based on a number of probability values previously assigned to the given FRU;

wherein the determining comprises analyzing probability values assigned to FRUs related to previously resolved faults.

18. A computer-readable storage medium encoded with a computer program comprising:

instructions that when executed cause a processor to:

receive error information related to a fault, from a plurality of components of a computer system;

assign one of two predetermined probability values to each of the plurality of components determined to be a possible cause of the fault;

determine, based on the predetermined probability values assigned to the components, that only a given field replaceable unit (FRU) of a plurality of FRUs should be replaced to correct the fault.

19. The computer-readable medium of claim 18, further comprising instructions that when executed cause a processor to:

retrieve non-error related computer system event information responsive to the fault; and analyze effects of the event on computer system FRUs as part of the determining.

20. The computer-readable medium of claim 18, further comprising instructions that when executed cause a processor to:

analyze probability values assigned to FRUs related to previously resolved faults as part of the determining; and determine the given FRU based on a number of probability values previously assigned to the given FRU.

* * * * *